United States Patent
Pitkänen et al.

(10) Patent No.: US 11,008,190 B2
(45) Date of Patent: May 18, 2021

(54) METHOD, SYSTEM AND A COMPUTER PROGRAM PRODUCT FOR CONDITION MONITORING OF A FIBER WEB OR PAPER FINISHING MACHINE

(71) Applicant: Valmet Technologies Oy, Espoo (FI)

(72) Inventors: Tatu Pitkänen, Nummenkylä (FI); Heikki Kettunen, Espoo (FI); Todd Vandenheuvel, Hortonville, WI (US)

(73) Assignee: VALMET TECHNOLOGIES OY, Espoo (FI)

( * ) Notice: Subject to any disclaimer, the term of this patent is extended or adjusted under 35 U.S.C. 154(b) by 344 days.

(21) Appl. No.: 16/079,533

(22) PCT Filed: Feb. 24, 2017

(86) PCT No.: PCT/FI2017/050122
§ 371 (c)(1),
(2) Date: Aug. 23, 2018

(87) PCT Pub. No.: WO2017/144785
PCT Pub. Date: Aug. 31, 2017

(65) Prior Publication Data
US 2019/0055102 A1  Feb. 21, 2019

(30) Foreign Application Priority Data
Feb. 25, 2016 (FI) .................................... 20165144

(51) Int. Cl.
*B65H 26/04* (2006.01)
*G01M 13/00* (2019.01)
(Continued)

(52) U.S. Cl.
CPC ............ *B65H 26/04* (2013.01); *B65H 18/26* (2013.01); *D21G 9/0009* (2013.01);
(Continued)

(58) Field of Classification Search
CPC .. B65H 26/04; B65H 18/26; B65H 2408/236; B65H 2515/314; B65H 2515/50;
(Continued)

(56) References Cited

U.S. PATENT DOCUMENTS

2011/0020532 A1* 1/2011 Lannes ...................... D21F 7/06
427/8
2014/0257719 A1* 9/2014 Figiel ..................... G01L 5/0085
702/41

FOREIGN PATENT DOCUMENTS

EP       2187190 A2     5/2010
WO    2006075055 A1     7/2006
(Continued)

OTHER PUBLICATIONS

Valmet Technical Paper Series, iRoll™—the intelligent roll. Valmet. Published Jan. 25, 2011, /www.valmet.com/globalassets/media/downloads/white-papers/roll-services/wpr_iroll.pdf, downloaded Aug. 1, 2018.

(Continued)

*Primary Examiner* — Lisa M Caputo
*Assistant Examiner* — Rose M Miller
(74) *Attorney, Agent, or Firm* — Stiennon & Stiennon (57) ABSTRACT

A method for monitoring a machine element in a paper finishing machine (10). The machine element mounted for rotation machine elements (16-19) equipped with a sensor assembly (24) measuring force or pressure, and a counter-pair (15, 20, 33, 44) for said machine element. The machine element is made to rotate against the counter-pair, a measurement signal (25) is generated between the machine element and the counter-pair with the sensor assembly, and recording a reference cross-directional profile (21) of force or pressure generated. Condition monitoring (38) of vibration with the reference profile is by comparison of current signals with the reference so as to detect periodic variation (Continued)

(39.1, 39.2) in the cross-directional pressure profile, and producing visual information (37) from the analysis for monitoring. The invention also relates to a corresponding system, a rotating machine element for the method or the system, and a computer program product.

**11 Claims, 8 Drawing Sheets
(1 of 8 Drawing Sheet(s) Filed in Color)**

(51) Int. Cl.
  *B65H 18/26* (2006.01)
  *D21G 9/00* (2006.01)
  *G01L 5/00* (2006.01)
(52) U.S. Cl.
  CPC ........... *G01L 5/0085* (2013.01); *G01M 13/00* (2013.01); *B65H 2408/236* (2013.01); *B65H 2515/314* (2013.01); *B65H 2515/34* (2013.01); *B65H 2515/50* (2013.01); *B65H 2553/24* (2013.01); *B65H 2553/26* (2013.01); *B65H 2601/524* (2013.01); *B65H 2801/84* (2013.01)
(58) Field of Classification Search
  CPC ............ B65H 2553/24; B65H 2553/26; B65H 2601/524; B65H 2801/84; D21G 9/0009; G01L 5/0085; G01M 13/00
  USPC .......................................................... 73/593
  See application file for complete search history.

(56) References Cited

FOREIGN PATENT DOCUMENTS

| | | |
|---|---|---|
| WO | 2008040845 A1 | 4/2008 |
| WO | 2008049973 A2 | 5/2008 |
| WO | 2011134487 A1 | 11/2011 |

OTHER PUBLICATIONS

Valmet Technical Paper Series, iRoll Update. Valmet. Published Jul. 18, 2014, www.valmet.com/global assets/media/downloads/white-papers/roll-services/wpr_irollupdate.pdf, downloaded Aug. 1, 2018.
International Search Report for PCT/FI2017/050122 dated Jun. 8, 2017.
Written Opinion of the International Searching Authority for PCT/FI2017/050122 dated Jun. 8, 2017.
P.B. Warren, P.E., "A Study of the Complexities of Vibration Analysis in the Paper Machine," semimac.org/wp-content/uploads/2015/12/sem.org-IMAC-XIII-13th-13-23-1-A-Study-Complexities-Vibration-Analysis-Paper-Machine.pdf.

* cited by examiner

METHOD, SYSTEM AND A COMPUTER PROGRAM PRODUCT FOR CONDITION MONITORING OF A FIBER WEB OR PAPER FINISHING MACHINE

CROSS REFERENCES TO RELATED APPLICATIONS

This application is a national stage of PCT/FI2017/050122 filed on Feb. 24, 2017, and claims priority on Finnish App. No. FI20165144 filed on Feb. 25, 2016, both of which are incorporated by reference herein.

STATEMENT AS TO RIGHTS TO INVENTIONS MADE UNDER FEDERALLY SPONSORED RESEARCH AND DEVELOPMENT

Not applicable.

BACKGROUND OF THE INVENTION

The invention relates to a method for condition monitoring of a fiber web or paper finishing machine, said fiber web or paper finishing machine including one or more sub-entities of which at least some have one or more rotating machine elements equipped with a sensor assembly measuring force or pressure, and a counter-pair for said machine element, and wherein
  the machine element is made to rotate against the counter-pair,
  a measurement signal is generated between the machine element and the counter-pair with the sensor assembly,
  a cross-directional profile of force or pressure generated between the machine element and the counter-pair is formed from the measurement signal.
The invention also relates to a corresponding system and a computer program product.

Measurement of vibrations on rolls is often critically important in fiber web and paper finishing machines. For example, vibration measurements based on acceleration sensors on bearing houses of rolls are known. However, it is often the case that vibration has increased excessively before it can be detected with a measurement on a bearing housing. This is particularly influenced by the fact that vibration is often excited in the middle of a roll nip.

Prior art vibration measurement sensor assemblies require a great amount of cabling, measurement electronics and customized software. Vibration measurement is often implemented in a machine as a retrofitting system. In this case, it is separate from the rest of the paper machine automation. This creates extraordinary costs.

Publication EP2187190 proposes an arrangement for measuring nip roll vibrations, wherein sensors have been installed on the roll as separate rings. A sensor assembly can reveal certain vibration problems that are caused by the roll pair itself. For example, these include unevenness or eccentricity of the roll cover, which can be repaired by local grinding of the cover. The measurement proposed in the EP publication requires a specific sensor assembly method, which does not provide a full profile for other purposes.

SUMMARY OF THE INVENTION

The object of this invention is to provide a method, a system, a rotating machine element and a computer program product, with which it is possible to improve and simplify condition monitoring of a fiber web or paper finishing machine particularly as regards vibration measurements.

In the method, a reference profile is formed for the cross-directional profile of force or pressure generated between the machine element and its counter-pair. The reference profile may be the cross-directional profile of force or pressure, for example, under non-vibrating conditions or it may be formed from a measurement signal that is as free as possible of disturbances. Furthermore, the cross-directional profile, formed from the measurement signal and representing force or pressure generated between the machine element and the counter-pair, and the reference profile are analyzed in the method. In the analysis, the profiles are compared with each other in order to detect periodic variation in the cross-directional profile. Visual information is produced from the analysis for condition monitoring, particularly for vibration monitoring.

Variations in the cross-directional profile indicate vibration. With the reference profile formed, it is possible to identify even weak vibrations occurring in the machine already at an early stage, monitor their development, make information related to vibrations available for the machine control system or known to the operator, and perform actions for damping vibrations. In addition, the invention enables easy and quick observation of the response caused by the actions performed. According to an embodiment, periodic variation can be detected by identifying and examining extreme values of force and/or pressure appearing in the cross-directional profile.

According to an embodiment, the sensor assembly with which the cross-directional profiles of force or pressure are formed includes one or more sensors that measure force or pressure directly or indirectly, integrated in the shell and/or the cover of the machine element. Owing to the sensor assembly, identification of vibrations can even be performed using measurement arrangements that already exist in the machine element, since it surprisingly takes place by utilizing a cross-directional measurement of a nip. In other words, with the invention it is possible to diversify the purpose of use of an existing sensor assembly in a surprising way without major installation or modification work. If the machine element is already equipped with a sensor assembly for measuring, for example, the cross-directional profile of nip force of a roll nip, the method according to the invention can even be a merely program-based implementation in the machine control automation. In this case, it is very simple to implement. Thus, the invention also relates to the use of a machine element for monitoring vibrations.

Based on variations occurring in the cross-directional profile of force or pressure, it is possible, for example, to draw conclusions about the source of vibration, determine its level, frequency and/or phase. Based on this information, it is possible, for example, to try to change the machine's operating conditions in such a way that vibration can be damped to a preset level, at which it does not cause essential harm. The counter-pair of the rotating machine element can vary greatly in the context of the invention. According to a first embodiment, it may be a structural component of a fiber web or paper finishing machine. Some examples of these include rolls and fabrics. According to a second embodiment, the counter-pair of the rotating machine element may be the product produced in a fiber web or paper finishing machine. Some examples of these include the web and/or a roll formed from the web and/or a roll from which the web is unwound. Other additional advantages achieved with the method, system and computer program product according to the invention become apparent from the description, and the characteristic features are set forth in the claims.

The invention, which is not limited to the embodiments set forth below, is described in more detail by making reference to the appended drawings.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DESCRIPTION OF THE PREFERRED EMBODIMENTS

Figures 1A, 1B:
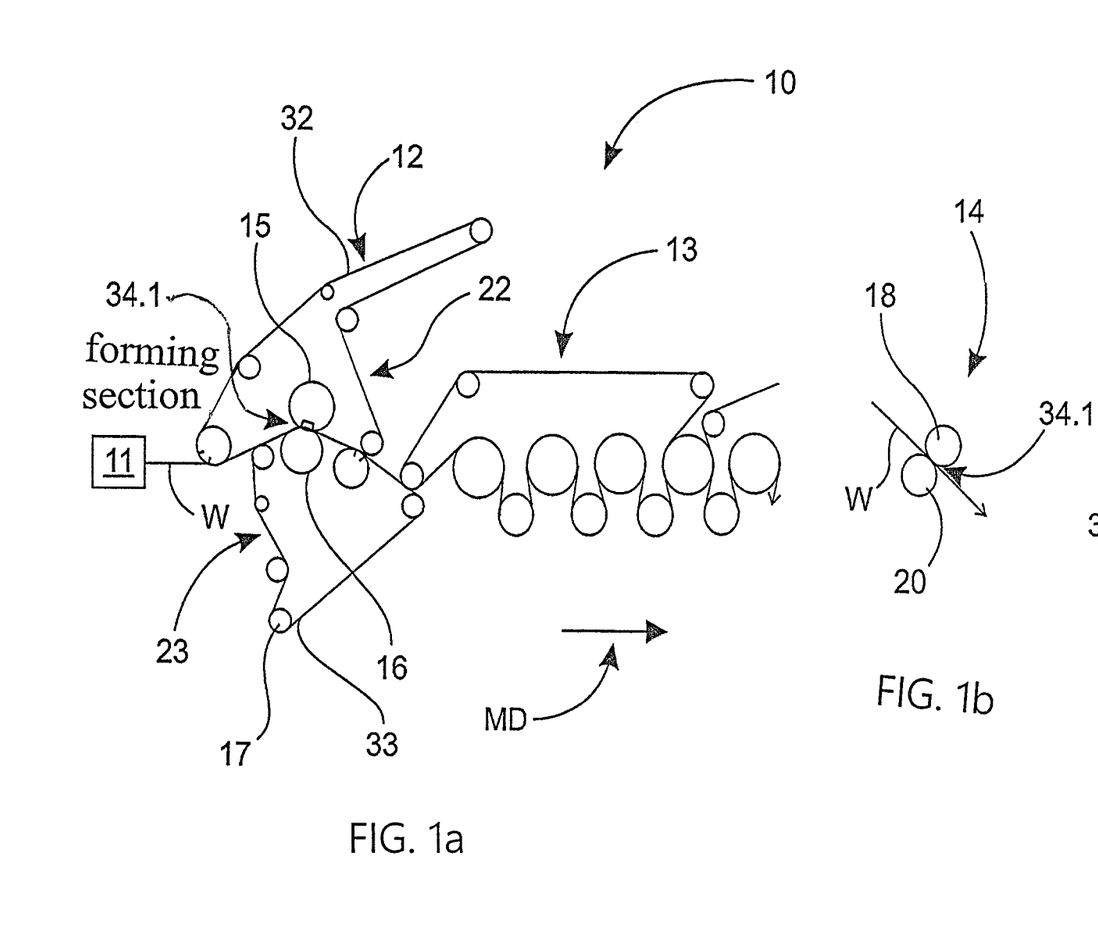
FIG. 1a shows a rough diagrammatic view of an example of a fiber web machine.
FIG. 1b shows a rough diagrammatic view of a coating or surface sizing station which can be an integral part of the machine of FIG. 1a or a separate sub-entity of its own.
Figure 1C:
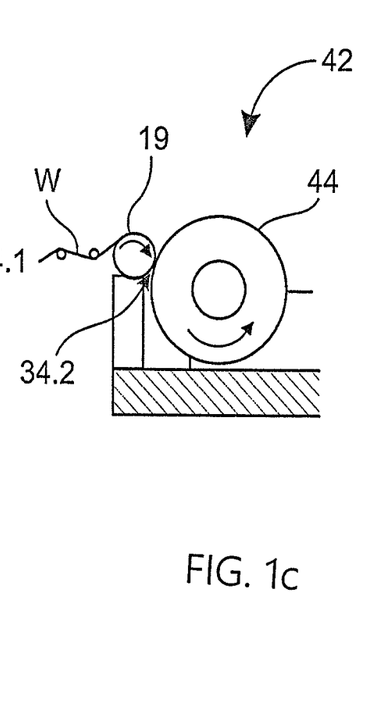
FIG. 1c shows a rough diagrammatic view of a reel which can be an integral part of the machine of FIG. 1a or a separate sub-entity of its own.

FIGS. 1a and 1b are a rough diagrammatic view of one example of an embodiment of the invention, which in this case is a fiber web machine 10. In addition to a fiber web machine, the invention can also be utilized in a paper finishing machine, for example as shown in FIG. 1c. Some examples of these may include slitting, calendering, surface sizing and/or coating. A fiber web or paper finishing machine includes one or more sub-entities 11-14, 42. A fiber web machine may include the following as subsequent sub-entities (FIGS. 1a, 1b, and 1c from left) located in the travel direction of the web W, i.e. in the machine direction MD: headbox (not shown), web forming section 11, press section 12, dryer section 13, possibly one or more finishing devices (not shown), and reel 42. A finishing device may be an integral part of the machine line (online) 14 or a separate sub-entity of its own (offline). Other components may of course exist between parts 11-14, 42; thus, the order set forth is not intended to limit the invention in any way. For example, after the dryer section 13, coating, surface sizing and/or calendering (reference number 14) and/or after-drying can take place, these being mentioned in this context merely as a few examples prior to the reel 42.

At least some of the sub-entities 11-14, 42 of the fiber web machine 10 have one or more rotating machine elements 15-20. Some examples of rotating machine elements are rolls and cylinders that are in contact with the web W or otherwise indirectly influence the web W. At least one fabric 32, 33 may be arranged to travel via rolls and cylinders, such as is the case with sub-entities 11-13, for example. Fabrics 32, 33 rotate in fabric runs 22, 23, which are defined, in addition to rolls and cylinders, by break back rolls that belong to rotating machine elements 17. Via break back rolls, the fabric 32, 33 is set to travel in the fabric run 22, 23 arranged for it. A sub-entity 14 may also be without a fabric run. In the exemplifying application, this is the case with the coating or surface sizing station or calender, or more generally with the sub-entity 14, as well as with the reel 42. In this case, the machine elements 18, 19, 20, i.e. rolls, are in direct contact with the web W on both of its sides. In some positions, the contact of the web W with a rotating machine element and/or a fabric can be one-sided only.

At least some of the sub-entities of the fiber web machine 10 have a counter-pair 15, 20, 33, 44 for the machine element 16-19. According to a first embodiment, the counter-pair 15, 20, 33 of the machine element 16-18 may be a structural component included in the fiber web machine 10. According to a second embodiment, it is also possible that the counter-pair for the machine element will only form when production starts, i.e. during the operation of the fiber web machine 10. In this case, the counter-pair may be the web W produced in the fiber web machine 10 or a roll 44 formed from the web W. In the case of a roll 44, the rotating machine element 19 is a reel drum that rotates against the roll 44 formed from the web W. The counter-pair can also be a roll, from which the web is unwound (at an unwinder, for example). Thus, the counter-pair of the machine element 16-19 may vary, for example, according to the position and purpose of use of the machine element.

According to an embodiment, the counter-pair 15, 20 of the machine element 16, 18 may be another rotating machine element, such as a roll. In this case, the machine elements 16, 18 and their counter-pairs 15, 20 are nip rolls, i.e. they form a roll nip 34.1 between them. A roll nip 34.1 is formed in a manner known per se by two rolls that are placeable and loadable against each other. As the design and principle of operation of the roll nip 34.1 and the rolls included in it are known per se for those skilled in the art, it is not necessary to explain them more profoundly in this context.

In the press section 12, the counter-pair 15 of the machine element 16 may be another rotating machine element, against which the machine element 16 can be arranged for forming a pressing roll nip 34.1 that removes water from the web W traveling via the roll nip 34.1. In turn, in a coating or surface sizing station 14, the counter-pair 20 of the machine element 18 can be a counter roll arranged for the coating/surface sizing roll, which counter roll can also be a coating/surface sizing roll. Similarly at the calender 14, the counter-pair 20 of the rotating machine element 18, a calender roll in this position, can be another corresponding calender roll. In the calender nip, the roll surfaces are in direct contact with the web W. Then it is possible to influence the bulk of the web W and/or its surface properties.

On the other hand, the counter-pair of the rotating machine element can also be the mere web W traveling via it. In this case, the rotating machine element is a roll or a cylinder located at some point of the run. The sensor assembly arranged in the roll or the cylinder can be used to measure the tension of the web W and/or the hardness of a paper roll, for example. In this case, the counter-pair of the machine element will only be formed during production, when the web W is produced in the fiber web machine 10 and/or a roll 44 is formed thereof. The web W passing via the machine element and forming the counter-pair for it travels onto the machine element supported at a selected wrap angle.

In addition to another machine element or the web W, the counter-pair of the rotating machine element 17 can also be a fabric 33. In this case, the rotating machine element 17 is a break back roll located at some point of the fabric run. Via the break back roll, the fabric 33 travels supported at the wrap angle selected for this.

Figure 2:
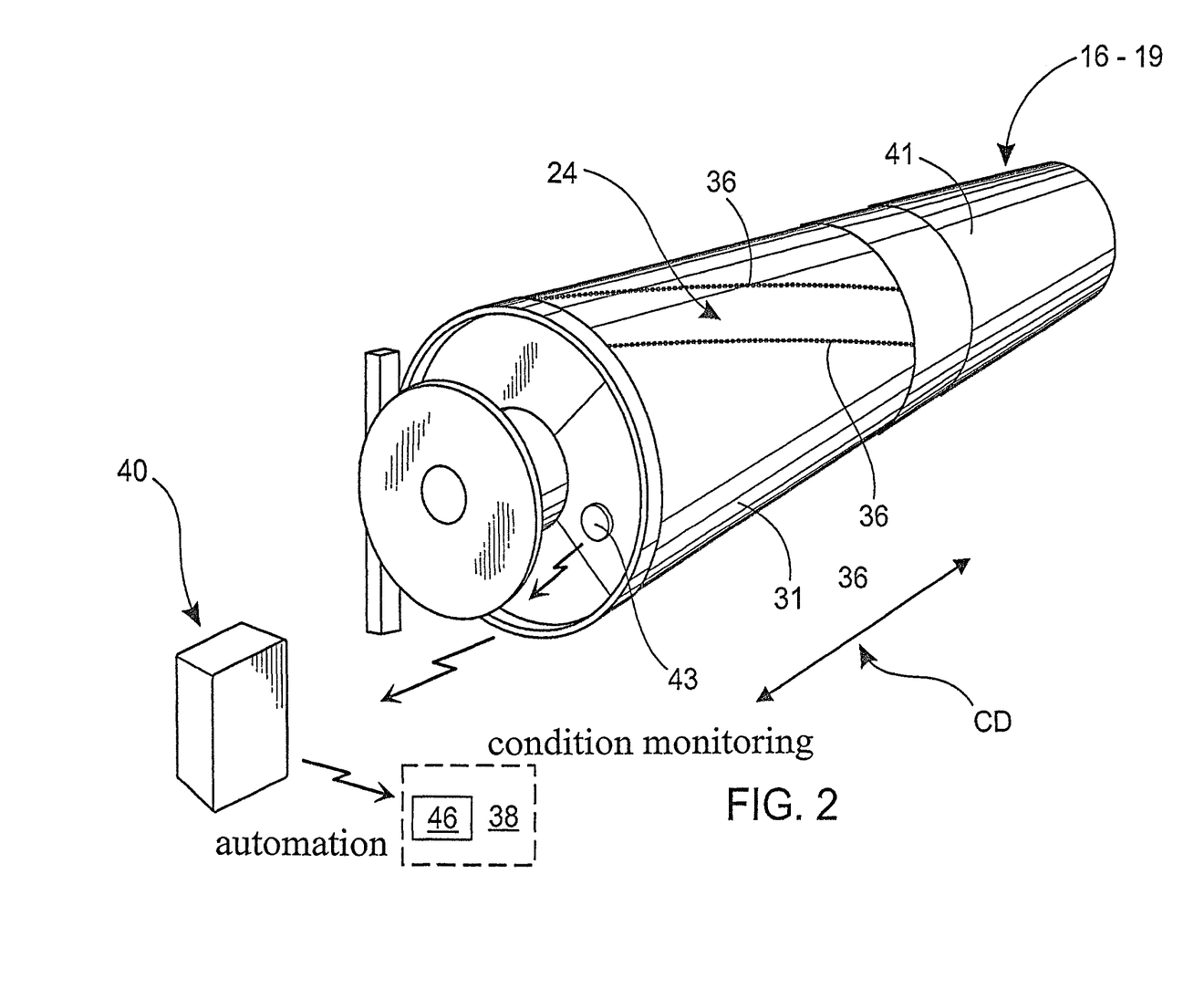
FIG. 2 shows an example of a machine element equipped with a sensor assembly, which can be utilized in the invention.

FIG. 2 shows an example of a rotating machine element 16, which is a press roll, for example. The machine element 16 is equipped with a sensor assembly 24 measuring force or pressure. The sensor assembly 24 can be formed of any sensors that measure pressure or force directly or indirectly. Hereinafter, when speaking of force, it may also mean pressure. By way of example, sensors may include piezoelectric sensors, piezoceramic sensors, piezoresistive sensors, force sensitive FSR sensors, capacitive sensors, inductive sensors, optical sensors, electromechanical film sensors, etc., which have a sufficient resolution for producing desired information. The sensor assembly 24 may be formed of a sensor band 36. The sensor assembly 24 may also be formed of a set of sensors formed of one or more discrete sensors 36.

According to an embodiment, the sensor assembly 24 may be based on an electromechanical film sensor 36 known per se, for example. One or more film sensors 36 have been arranged on the roll shell 31. An example of such a film sensor 36 are sensors known with the trade name EMFi. Other sensors made of film-like materials operating according to a similar principle can also be applied, such as PVDF sensors. More generally, these can be referred to as pressure sensitive film sensors. The sensor assembly 24 may typically be installed on the surface of the shell 31 of the machine element. In this case, one or more surface layers 41 are disposed on top of it. The sensor assembly 24 is protected under the surface layers 41. The sensor assembly 24 can also be installed between the surface layers 41.

Sensors 36 can be disposed on the shell 31 of the machine element 16-19 in a rising manner, as is shown in FIG. 2. When disposed in a rising manner, the sensors rotate around the shell 31 of the machine element in a spiral fashion at a distance from each other. The angle of rotation of the sensors 36, more generally the sensor assembly 24, on the shell 31 of the machine element may range between 180 and 320 degrees, for example. The roll may be provided with data transfer means 43 known per se for delivering a measurement signal 25 generated by the sensor assembly 24 to condition monitoring 38 included in the machine control automation, and now more specifically, to vibration monitoring. For example, this can be implemented with a transmitter provided at the roll end. With the transmitter, the measurement signal 25 is delivered to a receiver 40 arranged outside the roll. The receiver 40 may also be provided with a delivery feature for delivering the measurement signal 25 further to the machine control automation, to reception means 46 arranged therein.

Figure 3:
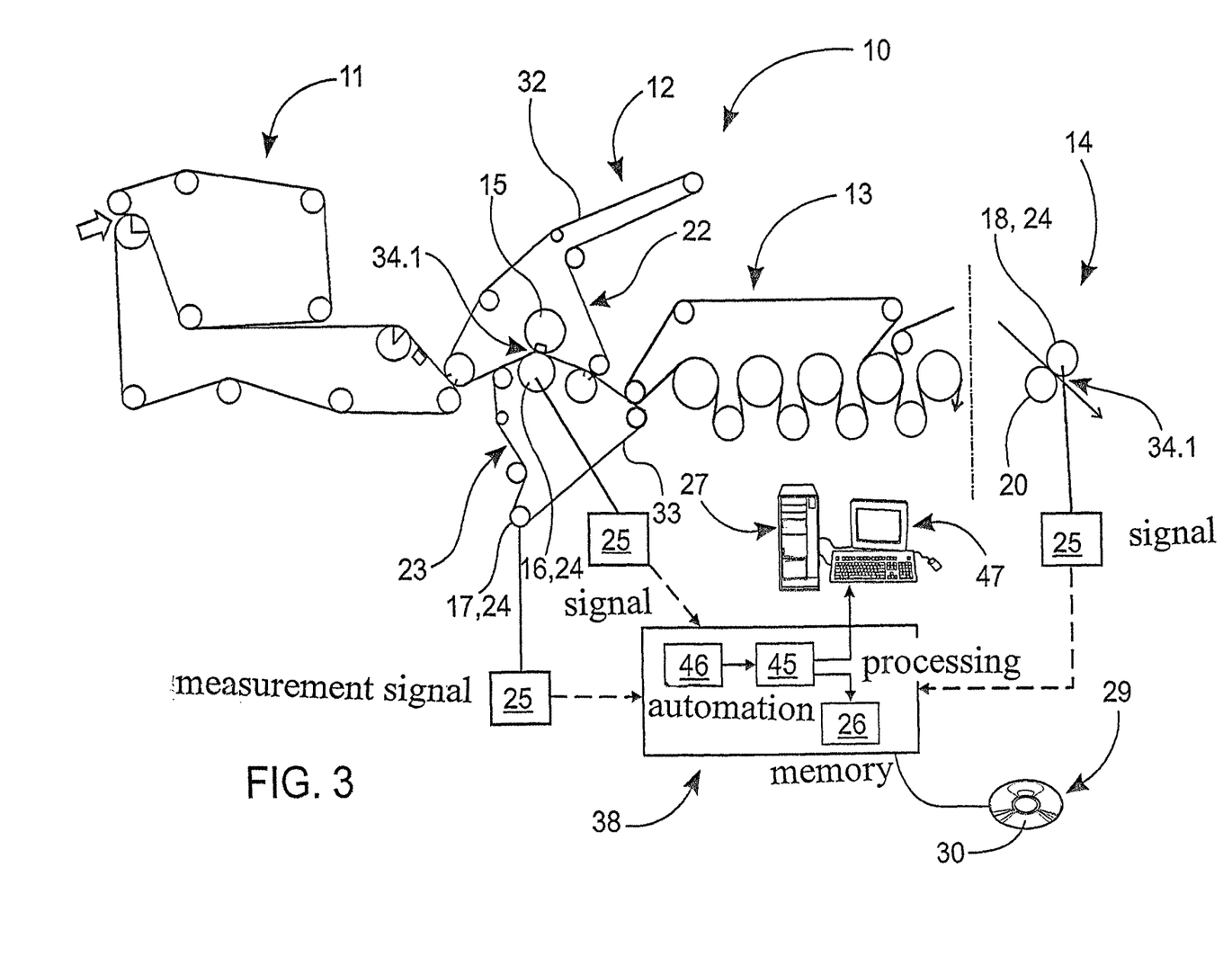
FIG. 3 shows the fiber web machine of FIGS. 1a, 1b and 1c and a condition monitoring system included therein.
Figure 4:
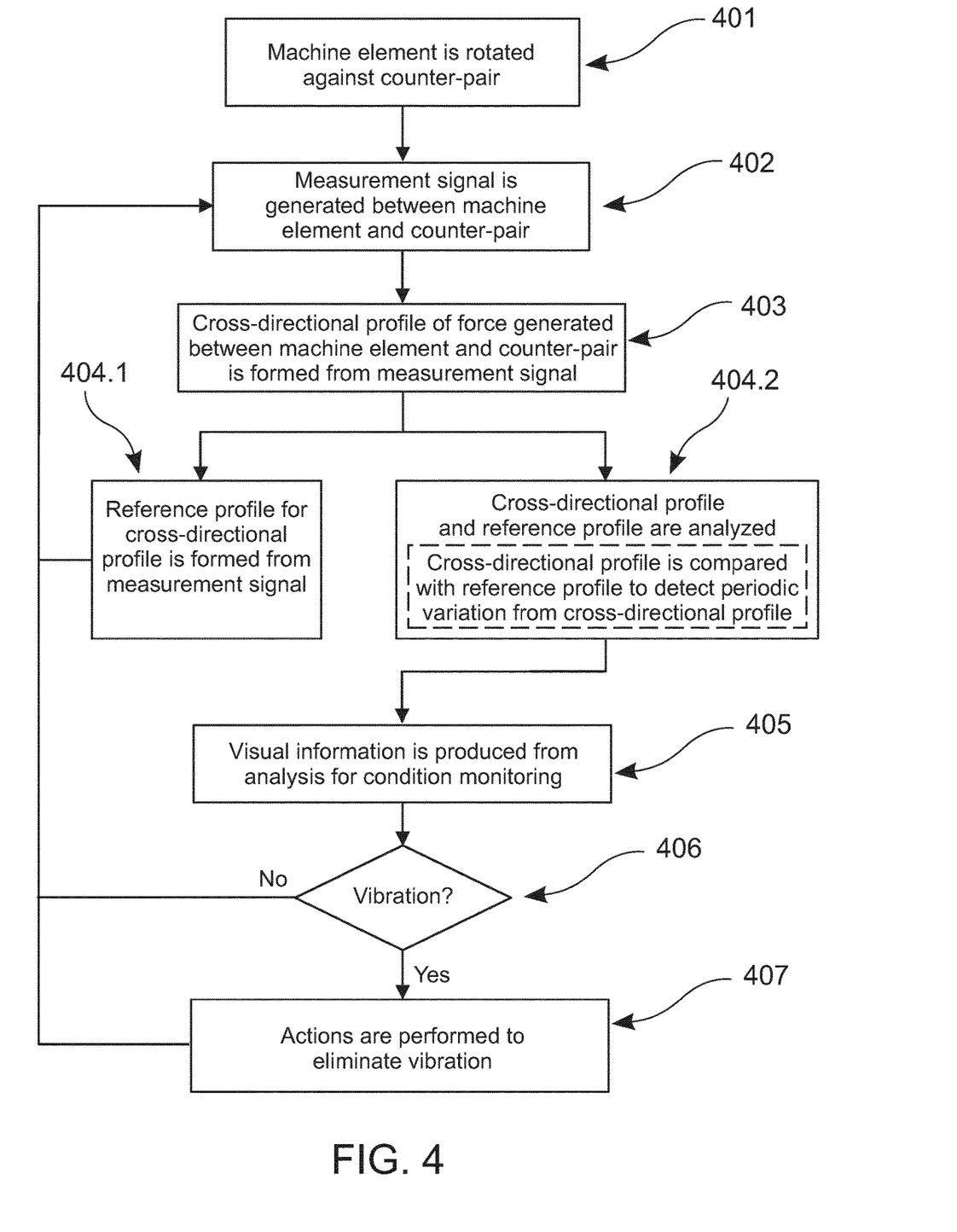
FIG. 4 shows a flowchart view of an example of the method according to the invention.

The method for condition monitoring of a fiber web or paper finishing machine is described below in more detail as an exemplifying embodiment referring to FIGS. 3 and 4. Condition monitoring is now more specifically vibration monitoring. FIG. 3 shows the fiber web machine 10 of FIGS. 1a, 1b and 1c and condition monitoring 38 connected thereto, now arranged to perform vibration monitoring. FIG. 4 is a flowchart view of an example of the method. As step 401 of the method, the machine element 16-19 equipped with a sensor assembly 24 is made to rotate against its counter-pair 15, 20, 33, 44. In that case the machine element 16, 18, 19 can form, for example, a roll nip 34.1 or a reeling nip 34.2 with its counter-pair 15, 20, 44. Likewise, the counter-pair 33 of the machine element 17 may also be a fabric or the web W produced with the machine, for example.

As step 402 of the method, a measurement signal 25 is generated between the machine element 16-19 and the counter-pair 15, 20, 33, 44 with the sensor assembly 24 arranged in the machine element 16-19. In that case the measurement signal 25 is generated in the roll nip 34.1 formed by the machine element 16, 18 and its counter-pair 15, 20 and/or between the machine element 17 and the fabric 33 and/or between the machine element 19 and the web W and/or the paper roll. The measurement signal 25 formed with the sensor assembly 24 is proportional to force generated between the machine element 16-19 and its counter-pair 15, 20, 33, 44. This force may vary in the cross-machine direction, i.e. in the longitudinal direction of the machine element 16-19 (reference symbol CD in FIG. 2).

The measurement signal 25 formed with the sensor assembly 24 can be stored. As step 403, a cross-directional profile 21 of force or pressure generated between the machine element 16-19 and the counter-pair 15, 20, 33, 44 is formed from the measurement signal 25. For example, in the case of the roll nip 34.1, this is the cross-directional profile of nip force.

The cross-directional profile of force or pressure formed in step 403 can be utilized in step 404, which can comprise two steps 404.1, 404.2 in a parallel manner. As step 404.1, a reference profile 35 is formed for the cross-directional profile 21 using the measurement signal 25. For example, the reference profile 35 is formed by measuring the cross-directional profile of force or pressure in non-vibrating conditions. It can also be formed by collecting the measurement signal 25 over a relatively long period and by computing an average for it. The collection of the measurement signal 25 and the formation of the reference profile 35 may be mainly continuous-time. The formation of the reference profile 35 can also take place with preset periods or as a one-off action.

The reference profile 35 is characterized by a preset type of constancy. The aim is to form a reference profile 35, for example, when the operating conditions of the fiber web machine 10 are known to be mainly optimal and production is known to take place mainly without disturbances. Then the measurement signal 25, from which the reference profile 35 is formed, is as free as possible from disturbances. The reference profile 35 of force or pressure between each machine element and its counter-pair is stored in the machine control automation for use. The reference profile 35 is used to analyze a momentary cross-directional profile 21 formed in a position corresponding to the reference profile 35, which can be performed as step 404.2 in parallel with step 404.1.

Step 404.2 of the method includes analyzing the cross-directional profile 21 formed from the measurement signal 25 and representing force or pressure generated between the machine element 16-19 and its counter-pair 15, 20, 33, 44, and the reference profile 35 formed in step 404.1. The purpose known per se of the sensor assembly 24 is to measure ("scan") the cross-directional CD profile; however, the sensor assembly 24 is also affected by force variations in the machine direction, in other words, differences in force profiles measured at different points in time. These are mainly caused by vibrations. This occurs particularly with sensor assemblies 24 that are installed in the machine element in a rising manner. Force variations are summed up as one measured row of samples. In normal conditions, when the vibration level is low, cross-directional profiles measured at different points in time are similar without significant differences. When a vibration is excited, it is noticed that periodic changes are summed up in the cross-directional profile. Based on these changes, it is possible to determine the level, frequency and phase of vibration, for example.

Thus, the purpose of the analysis performed in step 404.2 is to identify periodic variation in the cross-directional profile 21 of force and/or pressure. More specifically, the analysis may include a comparison of a momentary cross-directional profile 21 and a reference profile 35 formed over a longer period. The profiles 21, 35 are compared with each other to detect periodic variation in accordance with a preset criterion in the cross-directional profile 21 relative to the reference profile 35. The analysis, comparison and, for example, detection and identification of periodic variation in the cross-directional profile 21 take place in a computer-implemented way, for example.

According to an embodiment, the analysis includes a comparison of the cross-directional profile 21, formed from the measurement signal 25, with the reference profile 35 in order to detect periodic variation 39.1, 39.2 in the cross-directional profile 21 (FIGS. 5-10). Periodic variation 39.1, 39.2 in the cross-directional profile 21 is caused by vibration. According to an embodiment, periodic variation can be identified, for example, by detecting and analyzing extreme values of force or pressure occurring in the cross-directional profile 21, more generally, in the extreme values of force and/or pressure occurring in the cross-directional profile 21. Vibration may have one or more sources in a process. During the analysis, the cross-directional profile 21 can also be compared with the reference profile 35 in order to determine the portion that is due to variation 39.1, 39.2 in the cross-directional profile 21. In this way, it is possible to determine the quantity of vibration. To determine this, a differential profile can be formed. A differential profile is achieved by deducting the reference profile 35 from the cross-directional profile 21. Information about the portion due to variation 39.1, 39.2 can be used to support decision-making, when analyzing possible effects of vibration on the process and the need of reducing it.

In connection with the analysis of the differential profile, in step 405, information 37, particularly visual information, is produced from the analysis for condition monitoring 38, and now more specifically, for vibration monitoring of a fiber web or paper finishing machine. More specifically, visual information 37 can be produced from the analysis regarding the source, level, frequency and/or phase of variation 39.1, 39.2, i.e. vibration, determined in the cross-directional profile 21, for condition monitoring 38.

The frequency of variation 39.1, 39.2 can be determined from the measurement signal 25 using the FFT method, for example. In the case according to the embodiment, the rotational frequency of the machine element 16-19 and the angle of rotation of the sensor assembly 24 arranged therein can be used as the input thereof.

If it is determined in step 406 that vibration occurs, it is possible to proceed to step 407 for performing actions to damp vibration. Along with these actions, or if vibration was not detected in step 406, the execution of the method is continued. The method can be executed as a parallel continuous loop at least regarding the analysis. The generation of the reference signal 25, i.e. step 404.1, may be periodic or a one-off action.

Figure 5:
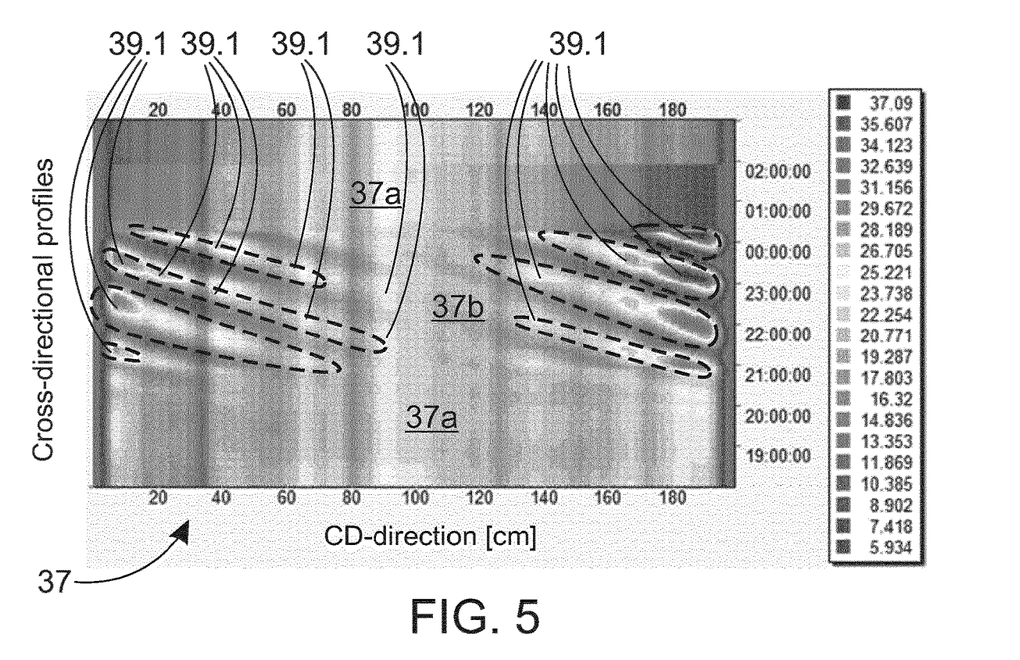
FIG. 5 shows an example of profile measurement data formed with a sensor assembly.
Figures 9, 10:
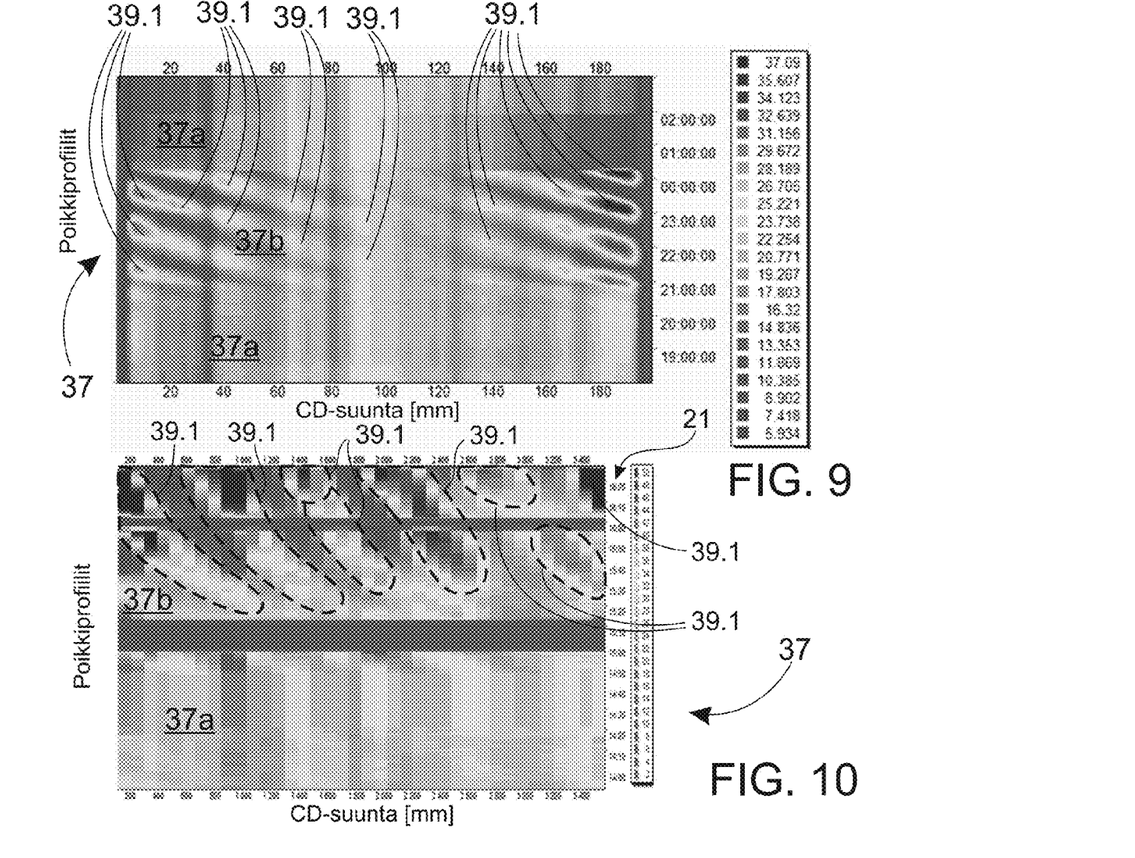
FIG. 9 shows a color image of the profile measurement data of FIG. 5.
FIG. 10 shows a color image of the profile measurement data of FIG. 6.
Figure 11:
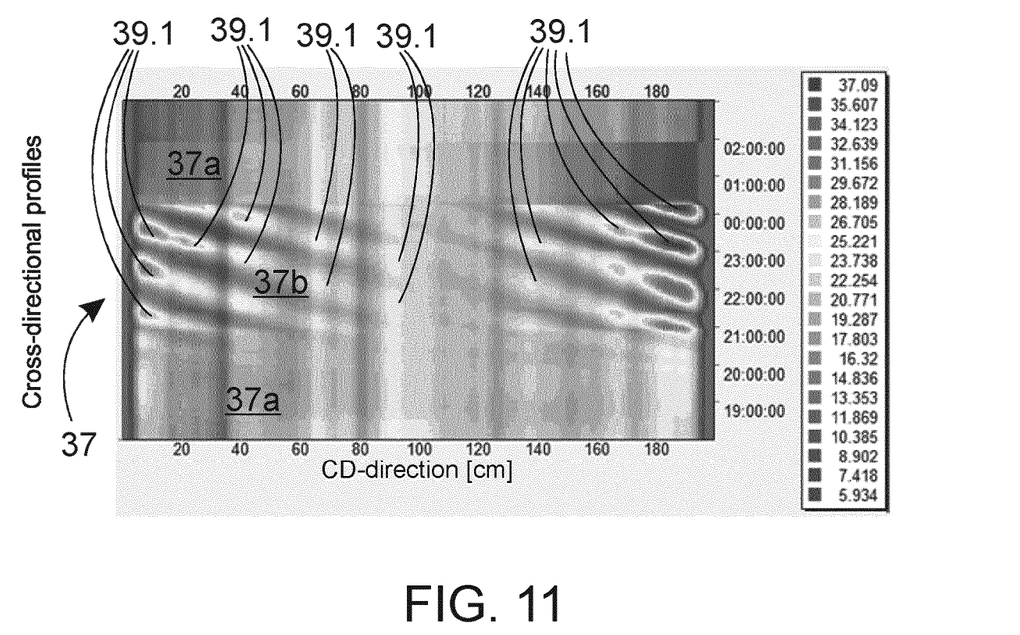
FIG. 11 shows a black-and-white printout of the color image of the profile measurement data of FIG. 9.

FIG. 5 shows an example of profile data formed with a sensor assembly 24 on a vibrating roll and how it is possible to distinguish the effect of vibration in it. Here, the sensor assembly 24 arranged in the roll is formed of electromechanical film sensors 36 and, more specifically, of a sensor assembly of the applicant, marketed with the trade name iRoll, wherein the cross-directional profile of a roll nip is measured with EMFi sensors. The film sensors 36 are disposed on the roll shell 31 in a rising manner. FIG. 9 portrays the profile data of FIG. 5 as a color chart, and FIG. 11 is a black-and-white printout of FIG. 9. In the graph of FIG. 5, the position axis (CD) is in the horizontal direction, corresponding to the points in the longitudinal direction of the roll or in the cross-machine direction, and the time axis is in the vertical direction, whereupon it is also possible to speak of a machine-directional representation. Hence, the cross-directional profiles of nip force measured at different points in time are shown in the horizontal direction in the graph. Different scales of gray (or colors) in the graph denote the magnitude of force at different points of the roll in the cross direction, or in the longitudinal direction of the roll.

In the graph of FIG. 5, dark areas mean such points in the roll in the cross-machine direction, in which the nip force is relatively high (29-37 kN/m) or relatively low (6-13 kN/m). In FIG. 9, these extreme points of forces are displayed as red and blue areas and can be shown as such in the graphs portrayed on the operator display panel 47. In turn, light areas in the graph of FIG. 5 mean such points in the roll in the cross-machine direction, in which the nip force is between the extreme points (14-28 kN/m). In FIG. 9, these points are displayed as yellow and green areas and can be shown as such in the graphs portrayed on the operator display panel 47. When vibration is excited (approx. at 21:00), a machine-directional disturbance is summed up in the cross-directional profile of force. This can be noticed from a periodic change in the graph. There the dark areas start to repeat in the graph portrayed on the operator display panel 47 alternating between red and blue. Small light areas remain between these extreme areas of force; these are shown as green and yellow points in the color image and thus also in the graph portrayed on the operator display panel 47. In FIG. 5, among the areas indicating variation, only the red areas, or points with the highest force, are indicated with reference number 39.1. The blue areas remaining between the red ones are without a reference number. Thus, areas 37a, in which nip force variations, in other words, deviation related to the reference profile is small, are detected in the graph, as well as area 37b which shows clearly detectable disturbances.

Periodicity is detectable in the disturbance. It can be noticed in that, when the phase of vibration changes, the peak and valley points of the cross-directional profile change place in the cross-machine direction. Actions have been taken to reduce variations after 00:00, and the profile measurement data at 01:00 indicates that they have been successful. Then the profile calms down, i.e. periodic changes can have been eliminated (or at least reduced) from the cross-directional profile data.

Figure 6:
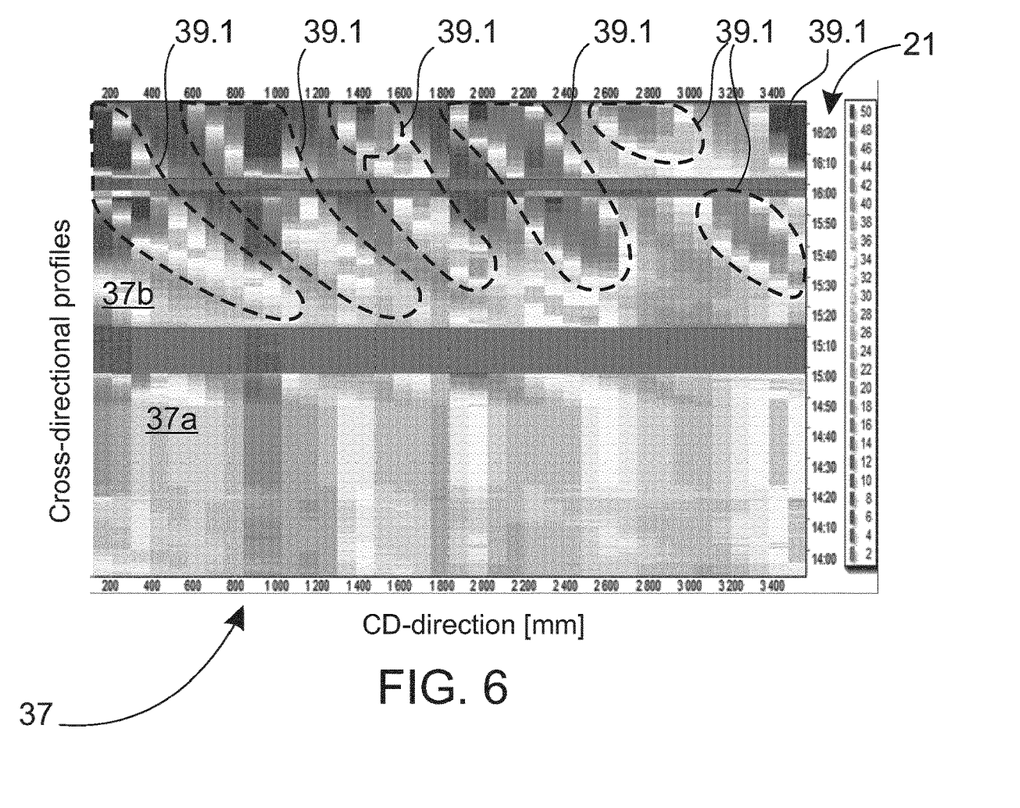
FIG. 6 shows a second example of profile measurement data formed with a sensor assembly.
Figure 12:
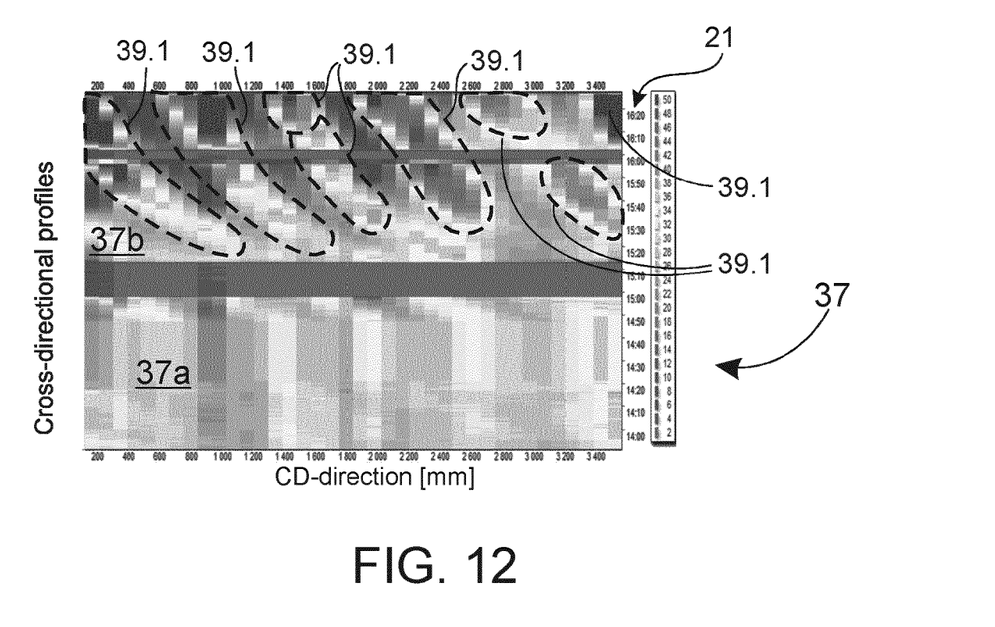
FIG. 12 shows a black-and-white printout of the color image of the profile measurement data of FIG. 10.

FIG. 6 is a second example of profile measurement data. Here, vibration is also excited during the measurement of the cross-directional profile. Here, the measurement has been implemented with spot-like piezo sensors arranged on the roll shell. FIG. 10 portrays the profile data of FIG. 6 as a color chart, and FIG. 12 is a black-and-white printout of FIG. 10. In the graph of FIG. 6, the position axis (CD), i.e. the points in the longitudinal direction of the roll i.e. in the cross-machine direction, is again shown in the horizontal direction, while the time axis, i.e. the points in time of the cross-directional profiles, is shown in the vertical direction, whereupon it is possible to speak of a machine-directional representation. Thus, the cross-directional profiles of nip force measured at different points in time are again shown in the horizontal direction in the graph. Different scales of gray (or colors) in the graph denote the magnitude of force at different points of the roll in the cross direction, i.e. in the longitudinal direction of the roll.

The cross-directional profiles shown in the horizontal direction in the graph, in the lower part 37a of the graphs, have been measured in normal conditions without vibration. Thus, in practice, the measurement only represents the shape of the cross-directional profile of nip pressure. In the graph of FIG. 6, dark areas mean such points in the roll in the cross-machine direction, in which the nip force is relatively high (38-50 kN/m) or relatively low (2-18 kN/m). In FIG. 10, these are again displayed as red and blue areas and can be shown as such on the operator display panel 47. In turn, light areas in the graph of FIG. 6 mean such points in the roll in the cross-machine direction, in which the nip force is between the extreme areas (20-36 kN/m). In FIG. 10, these are yellow and green areas and can be shown as such on the operator display panel 47.

In the upper part of the graph of FIG. 6, it can be seen how a disturbance in the machine direction again shows in the cross-directional profile as a periodic change 37b (after 15:30). Again, the dark areas represent the relative extreme ends of forces, i.e. variation i.e. vibration, while the lighter areas between these indicate normal nip pressure. Small light areas remain between these extreme areas of force; these are shown as green and yellow points in the color image and thus also in graphs portrayed on the operator display panel 47. In FIG. 6, among the areas indicating variation, only the red areas, or points with the highest nip force, are indicated with reference number 39.1. The blue areas remaining between the red ones are again without a reference number in FIG. 6. In the graphs of FIGS. 5, 9 and 6, 10, absolute measured values of forces have been used. The graphs could also be implemented as a differential profile graph, that is, without a reference profile. In this case, mainly the vibration peaks 39.1, 39.2 of the area 37b would only be displayed in the data chart, whereas conditions without vibration 37a would be displayed as mainly monotone.

Figure 7:
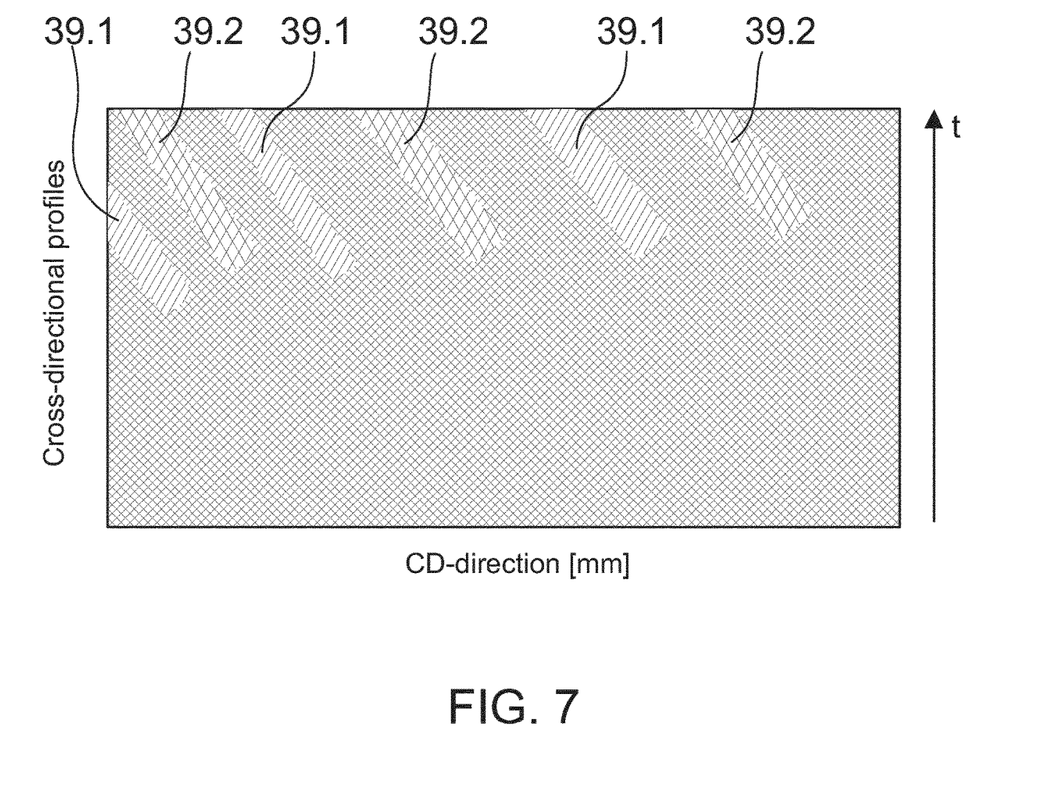
FIG. 7 shows a basic view of the profile measurement data of FIG. 6.

FIG. 7 is a basic view of this using the profile measurement data of FIG. 6. Here the areas in which extreme values of forces occur are indicated with reference numbers 39.1 and 39.2. Remaining between the extreme value ranges of forces 39.1, 39.2, there are transition areas (green and yellow points in color images and in graphs portrayed on the operator display panel 47), via which force changes from high to low and vice versa. These are shown with diagonal line shading in FIG. 7. Force can also be replaced with pressure. Periodic variation can be identified, for example, by detecting these extreme values and by analyzing them.

Figure 8:
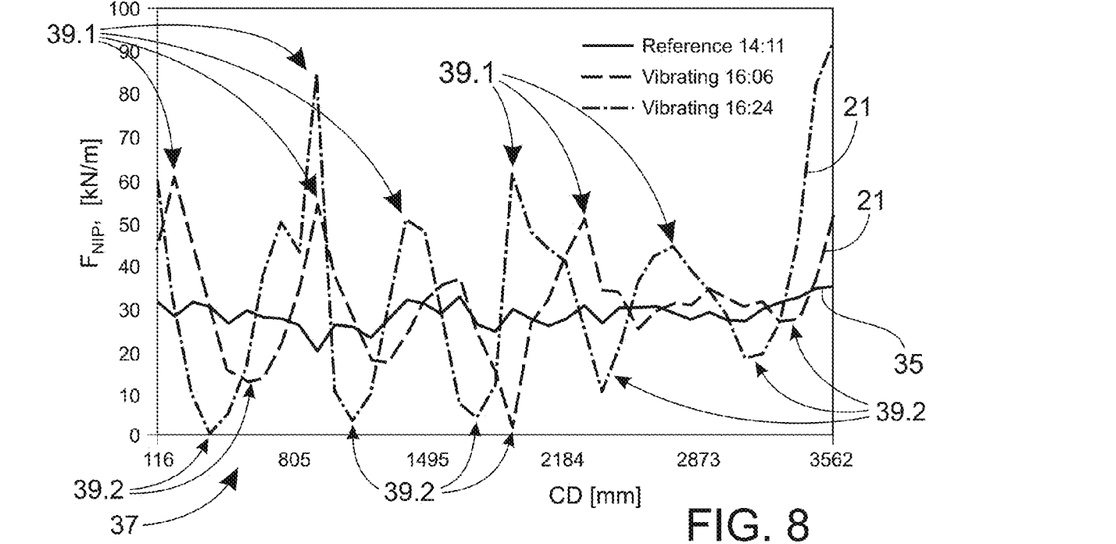
FIG. 8 illustrates information produced from the profile measurement data of FIG. 6.

In turn, FIG. 8 shows graphs of cross-directional profiles 21 from different points of the color chart of FIGS. 6 and 9 (and 11). The position axis (CD), i.e. points on the roll shell in the cross-machine direction, is shown again in the horizontal direction and the force axis in the vertical direction. In FIG. 8, the reference profile 35 is drawn with a continuous line. It represents the cross-directional profile of a roll nip in conditions without vibration. The reference profile 35 may have been collected over a long period that is known to be without disturbances. The two other cross-directional profiles 21 drawn with broken lines represent situations in which the roll vibrates. They have been formed from the measurement signal 25 at two different points in time.

These cross-directional profiles 21 clearly show the peak values 39.1, 39.2 caused by periodic variation, which are summed up in the profile 21. Based on these profiles, it is possible to determine the portion caused by vibration by forming a differential profile, that is, by deducting the reference profile 35 relating to non-vibrating conditions from the cross-directional profile 21 of vibrating conditions. This computation can be performed automatically online. Thus, based on the variation of the measurement signal 25, it can be seen whether vibration starts to be excited and what its frequency and phase are. The reference profile 35 also enables the consideration of the individuality of machine elements. Each machine element can have a reference profile 35 of its own, which can vary from each other, even though machine elements corresponding to each other would occupy the same position.

In the analysis (step 404.2 of the flowchart of FIG. 4), it can also be determined whether vibration is synchronized with a particular machine element. For example, vibration may be synchronized with the machine element equipped with the sensor assembly 24 with which the measurement signal 25 indicating vibration is produced, but it can also be synchronized with some other machine element, in the same sub-entity, for example. For example, the frequency of vibration determined based on the analysis can be compared with the rotational frequency of the machine element equipped with the sensor assembly 24 and/or, in case of a roll nip, with the rotational frequency of the counter-pair of the machine element, i.e. the counter roll. The frequency of variation determined based on the analysis can also be compared with some other known frequency. An example of this could be the computational/measured specific vibration frequency of the roll/roll bearing or other corresponding frequency. If the frequency determined and the frequency of these machine elements do not show congruency, the problem is somewhere else than in the machine element or its counter-pair.

Various indices, parameters and effective values can also be computed for vibration (for example, peak-to-peak of the vibration level, as well as other indicators to describe the total level of vibration). One way of doing this is averaging, such as computing the root-mean-square (RMS) value for the measurement signal 25. These can also be further visualized and used for generating alarms and drawing conclusions.

Frequency computation can be performed with FFT. In this, the rotational frequency of the roll and the angle of rotation of the sensor 36 are used as information. If the invention is applied in the applicant's iRoll system, the system knows the rotational frequency of the roll, and the sensor angle is specific to each roll and is also known in the parameters. Therefore, it is not necessary to add anything else, for example, to the iRoll system except but only software for vibration measurements.

Vibration detection can be performed mainly continuous-time. Visual information 37 can include graphs, trends and tables. Information can be published on the display panel 47 of the automation system specifically to each roll at predefined intervals or at user-defined intervals, for example. According to an embodiment, information can even be in a video format. Thus, a time domain representation is collected from several temporally successive pieces of cross-directional profile data. A wave motion excited and manifested in the cross-directional profile very clearly illustrates the vibration detected by the measurement.

Visual information 37 may include a graphic representation of the cross-directional profile 21 at different points in time, shown in the machine direction (FIGS. 5, 6, 9 and 10). Visual information 37 may include a graphic representation of the differential profile at different points in time, shown in the machine direction (FIGS. 7 and 11). Visual information 37 may include a graphic representation of the cross-directional profile 21 and the differential profile measured at different points in time (FIG. 8). Visual information 37 may include a video format representation composed of the cross-directional profile 21 and/or the differential profile at different points in time.

In addition to a method, the invention is also related to a system for condition monitoring, and now more specifically, to vibration monitoring of a fiber web or paper finishing machine 10. The system includes a sensor assembly 24 that measures force or pressure and is disposed on a shell 31 and/or a cover 41 of one or more machine elements 16-19 for generating a measurement signal 25 between a machine element 16-19 and a counter-pair 15, 20, 33, 44, processing means 45, user interface means 27, and memory means 26. The processing means 45 is arranged to form a cross-directional profile 21 of force or pressure arranged to be generated between the machine element 16-19 and the counter-pair 15, 20, 33, 44, from the measurement signal 25. The processing means 45 is also arranged to determine a reference profile 35.1 and compute a differential profile. The user interface means 27 is provided for examining the cross-directional profile 21. The user interface means 27 includes an operator display panel 47 or equivalent. In addition, the user interface means 27 is arranged to display the reference profile 35 and/or the differential profile formed based on the reference profile 35 and the cross-directional profile, for example. More generally, it is possible to speak of information 37 produced by means of these concerning to vibration and, more specifically, to vibration monitoring.

In the system, the processing means 45 is arranged to form a reference profile 35 for the cross-directional profile 21 of force or pressure arranged to be generated between the machine element 16-19 and the counter-pair 15, 20, 33, 44, from the measurement signal 25 formed with the sensor assembly 24. According to a first embodiment, it may be a cross-directional profile of force or pressure under non-vibrating conditions. According to a second embodiment, it may have been formed from the measurement signal 25 that is as free as possible of disturbances. The reference profile 35 is arranged to be stored in the memory means 26.

In turn, the processing means 45 is arranged to analyze the cross-directional profile 21 of force or pressure, arranged to be generated between the machine element 16-19 and its counter-pair 15, 20, 33, 44, and the reference profile 35, for detecting variation in the cross-directional profile 21. During the analysis arranged to be performed with the processing means 45, the cross-directional profile 21 and the reference profile 35 are compared to each other. Variation, which is arranged to be detected from the cross-directional profile 21 by the processing means 45, is periodic. Thus, it indicates the presence of vibration. According to an embodiment, periodic variation can be identified with the processing means 45 i.e. more generally, in a computer-implemented way, for example, in the extreme values of force and/or pressure appearing in the cross-directional profile 21 by detecting and examining these.

The user interface means 27, assisted by the processing means 45, is arranged to produce, for example, visual information 37 from the analysis for condition monitoring 38 and now, more specifically, for vibration monitoring. The system is arranged to carry out the sub-steps of the method described above.

In the context of the method and system, it is possible to connect, for example, active vibration damping technology or alarms when the vibration level exceeds the preset maximum level. For example, one way to attenuate vibration may be to change the speed of machine elements. In this case, the speed change evades vibration.

In addition to a method and a system, the invention also relates to a rotating machine element 16-19 and its use for vibration monitoring. It includes a shell 31, one or more cover layers 41 disposed on the shell 31 and a sensor assembly 24 installed in a spiral fashion under or within the one or more cover layers 41. The machine element 16-19 is used in the method or system described above for vibration monitoring.

In addition to a method and a system, the invention also relates to a computer program product 29 for vibration monitoring. The computer program product 29, which may be placed in a suitable storage media or is downloadable over an information network, is provided with a computer program logic 30 configured to provide the method described above.

The method, system and computer program logic 30 according to the invention for vibration monitoring can be arranged as part of the machine control automation, for example. Vibration analysis may be automatic and mainly continuous-time. Owing to the invention, it is possible to detect the source of vibration, adjust operating conditions to damp vibration and observe whether vibration was damped by this.

The method can be used for vibration monitoring in all measuring positions equipped with a sensor assembly 24 in the press, coating station, surface sizing station, calendars, reels and winder. Likewise, the method can be implemented as a service product. In this case, the sensor assembly 24 is arranged on the shell of the machine element temporarily for measurements and will be removed after performing the measurements.

It is understood that the above description and the figures related thereto are only intended to illustrate the present invention. Thus, the invention is not only limited to the embodiments proposed above or those defined in the claims, but many different variations and modifications of the invention, which are possible within the inventive idea defined in the appended claims, will be evident to those skilled in the art.

The invention claimed is:

1. A method for displaying a pattern signifying vibration in a fiber web machine or a paper finishing machine, the method employing at least one roll mounted for rotation and equipped with a sensor assembly that measures a cross-directional profile of force and/or pressure between the roll and a counter-pair when engaged in a relation where the roll is rotated against the counter-pair, comprising the steps of:
  recording with the sensor assembly at least one cross-directional reference profile of force and/or pressure, between the roll and the counter-pair as the roll rotates against the counter-pair, wherein the reference profile is obtained while the cross-directional profile is substantially non-varying, or is a computed average of the cross-directional profile over a time period which forms a substantial non-varying value;

comparing a measurement signal from the sensor assembly comprising at least a cross-directional profile of force and/or pressure between the roll and the counter-pair when engaged in a relation where the roll is rotated against the counter-pair with the cross-directional reference profile, wherein the cross-directional profile and the cross-directional reference profile are with respect to the same roll and counter-pair which are engaged in the same relation; and visually displaying the measurement signal compared to the cross-directional reference profile over time, to show vibrational loading experienced by the sensor assembly for condition monitoring.

2. The method of claim 1 wherein the step of comparing the measurement signal from the sensor assembly to the cross-directional reference profile is by forming a differential profile between the cross-directional profile and the cross-directional reference profile.

3. The method of claim 2 wherein the step of visually displaying includes display of a time series of a plurality of measurement signals compared to the cross-directional reference profile, and wherein the step of visually displaying further comprises displaying a graphic representation of the cross-directional profile at different points in time, to display time varying loading in the cross-direction.

4. The method of claim 1 wherein the step of visually displaying the measurement signal compared to the cross-directional reference profile, to show vibrational loading experienced by the sensor assembly, is in a video format representation formed of the cross-directional profile or the differential profile at a multiplicity of sequential points in time.

5. The method of claim 1 wherein information from the measurement signal from the sensor assembly is analysis regarding the source, level, and at least one of frequency and phase of variation.

6. The method of claim 1 further comprising determining the frequency of variation from the measurement signal with a Fast Fourier Transform (FFT) method.

7. A method for displaying a pattern signifying vibration in a fiber web machine or a paper finishing machine, the method employing at least one machine element mounted for rotation and equipped with a sensor assembly that measures a cross-directional profile of force and/or pressure between the machine element and a counter-pair when engaged in a relation where the machine element is rotated against the counter-pair, comprising the steps of:

recording with the sensor assembly at least one cross-directional reference profile of force and/or pressure, between the machine element and the counter-pair as the machine element rotates against the counter-pair, wherein the reference profile is obtained while the cross-directional profile is substantially non-varying, or is a computed average of the cross-directional profile over a time period which forms a substantial non-varying value;

comparing a measurement signal from the sensor assembly that measures a plurality of cross-directional profiles over time to the cross-directional reference profile, wherein the cross-directional profiles over time and the cross-directional reference profile are with respect to the same machine element and counter-pair which are engaged in the same relation; and continuously displaying with respect to time visually, a time series of the measurement signal compared to the cross-directional reference profile, to show time varying changes arrayed in the cross-machine direction which correlate to vibrational loading experienced by the sensor assembly.

8. The method of claim 7 wherein the counter-pair of the machine element equipped with a sensor assembly is another rotating machine element or a roll forming from a fiber web produced in a fiber web machine, with which the machine element equipped with said sensor assembly forms a roll nip or a reeling nip.

9. The method of claim 7 wherein the cross-directional profile formed from the measurement signal and representing force or pressure generated between the machine element and its counter-pair and the reference profile are analyzed by comparing them with each other for detecting periodic variation extreme values of force or pressure appearing in the cross-directional profile.

10. The method of claim 7 wherein the rotating machine element includes a shell, at least one cover layer disposed on the shell, and a sensor assembly installed in a spiral fashion under at least one or between at least two of said cover layers.

11. A system for displaying a pattern signifying vibration in a fiber web machine or a paper finishing machine, the system comprising:

at least one machine element mounted for rotation and engaging a counter-pair, the machine element being equipped with a sensor assembly connected to form an output signal source of a cross-directional profile of force and/or pressure between the machine element and a counter-pair;

a data memory connected to the output signal source to record a cross-directional reference profile while the cross-directional profile is substantially non-varying, or receiving from a computer an average of the cross-directional profile over a time period which forms a substantial non-varying value;

a computer connected to the output signal source and having an images feed output which supplies a plurality of time sequenced display outputs of the cross-directional profile of force and/or pressure between the machine element and the counter-pair, from which the cross-directional reference profile, after retrieval from the data memory is subtracted;

wherein the cross-directional profiles over time and the cross-directional reference profile are with respect to the same machine element and counter-pair which are engaged in the same relation; and an operator display panel connected to the images feed output to over time display in one direction the cross-directional profiles and in a transverse direction each of the plurality of time sequenced display outputs aligned one after another to show time varying changes in the crossmachine direction which correlate to vibrational loading experienced by the sensor assembly.

* * * * *